Sept. 16, 1947.    R. T. LAWRY    2,427,466
ROD HOLDER
Filed Nov. 20, 1944
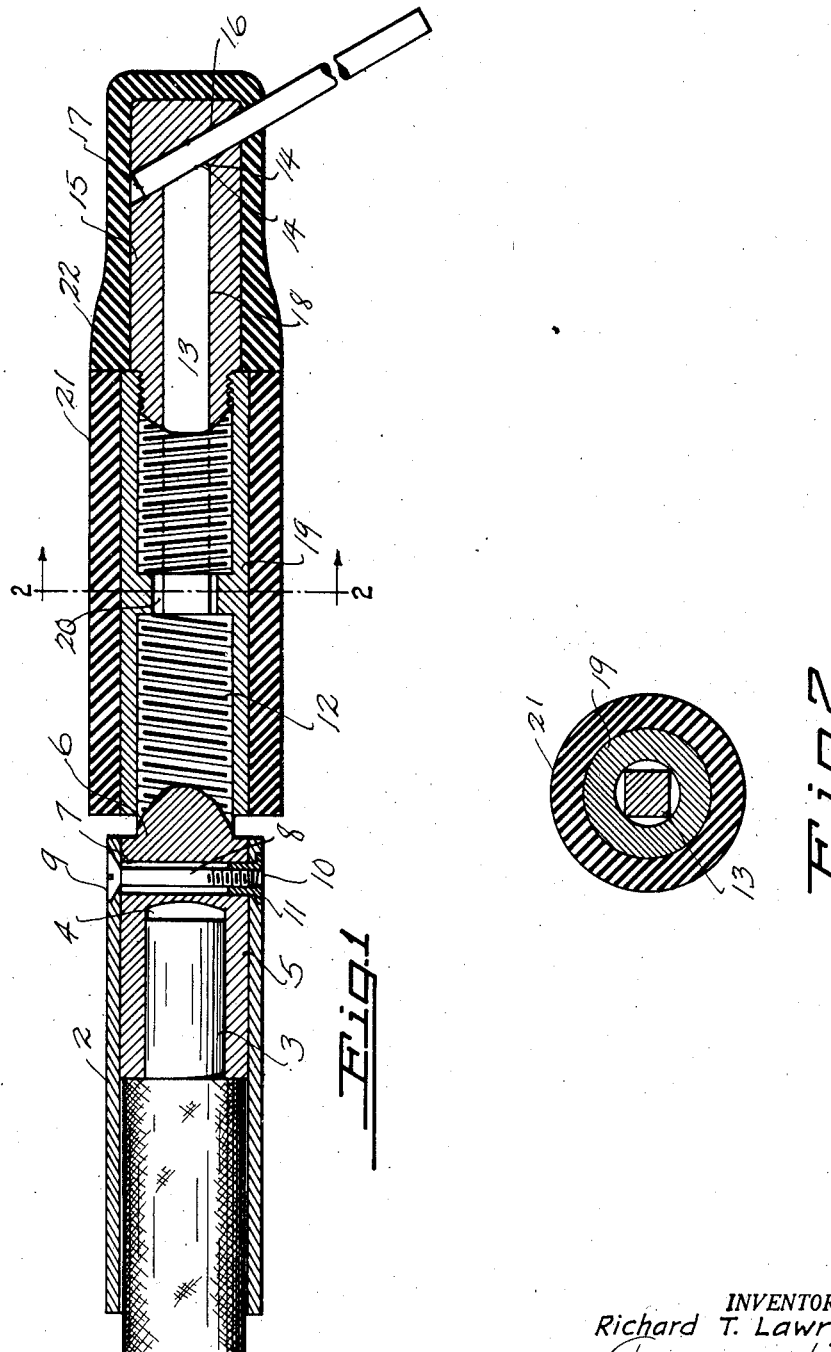
INVENTOR.
Richard T. Lawry
BY Edward C. Healy
ATTORNEY Patented Sept. 16, 1947

2,427,466

UNITED STATES PATENT OFFICE 2,427,466

ROD HOLDER

Richard T. Lawry, Richmond, Calif.

Application November 20, 1944, Serial No. 564,345

1 Claim. (Cl. 219—8)

1

This invention relates to improvements in rod holders and has particular reference to a holder for welding rods.

The principal object of the invention is the provision of means for positioning the welding rod at an angle relative to the holder to thus readily facilitate many welding operations.

A further object of the invention is to provide means for positively and firmly retaining the rod in its clamped position against danger of accidental displacement and to provide a holder that can be easily operated to produce the desired clamping operation of the welding rod therein.

A further object of the invention is the production of a rod holder that is economical to manufacture, positive in operation, strong, durable and highly serviceable in use.

In the accompanying drawings wherein for the purpose of illustration is shown the preferred form of the invention and wherein like numerals are employed to designate like parts throughout the same, Fig. 1 is a longitudinal sectional view of the holder, parts of the same being shown in elevation, and Fig. 2 is a transverse vertical section through the holder, the view being taken on the line 2—2 of Fig. 1.

In the accompanying drawing the numeral 2 designates a tubular insulated member that is adapted to house therein an electric cable 3 suitably insulated. As disclosed to advantage in Fig. 1 it will be noted that the cable enters the bore 4 formed in the end portion 5 of a conductor rod 6. The said rod has a transverse opening 7 provided therein in which is positioned a set screw 8, having a head 9 and threads 10. The said threads are received in a fiber bushing 11 positioned in the tubular member. This construction serves as a means for securing the rod holder to said tubular member. Continuing from the bored end 5 is an externally threaded portion 12 of the conductor rod. The threads in this instance are left hand threads and said threaded portion 12 has integrally formed therewith an elongated square spindle 13. Thus the conductor rod per se embodies in its construction the bored end 5, the externally threaded portion 12 and the elongated spindle 13 that terminates in a tapered end 14, to provide a nose 14', the purpose of which will be later described.

The holder head of the device embodies in its construction a head 15 having an angular slot 16 provided therein that is adapted to receive the electrode or in other words the welding rod

2

17. Due to the use of an angular slot the rod 17 can readily be held at an angle of approximately 60 degrees relative to the rod when it is contacted by and firmly engaged by the nose 14' of the elongated spindle 13. To realize this positive retention or firm engagement, the head has a longitudinal square bore 18 provided therein and in said bore there is received the square spindle 13.

It will be also observed that the right hand external threads are formed on the reduced inner end of the holder head. To complete the assembly a clamping nut 19 encompasses the left hand threaded portion 12 and the right hand threaded reduced end of the conductor head. It will be noted that a hole 20 is provided between the threads for clearance of the elongated square spindle as the clamping nut is turned to effect longitudinal movement of the elongated spindle to thus retain or release the electrode from its operative position within the holder. Suitable insulation 21 and 22 covers the clamping nut and the holder head. After the device has been assembled as disclosed in Fig. 1 a twisting movement imparted to the clamping nut will cause the elongated spindle to contact the welding rod and maintain firm and positive engagement therewith for the work to be performed. When it is desired to release the welding rod a reverse twisting movement imparted to the clamping nut will permit the user to readily dislodge the used welding rod.

It is obvious that in the production of this type of holder a great saving can be effected in welding rods, because it is possible to burn the rods to a minimum length; that in the use of the right and left hand threads very little movement is required to enable the operator to remove the studs and secure the electrode and accordingly this action will be effective in equally distributing the wear of the threads and will give longer life to the threads. The assembly has a large current carrying capacity and therefore the holder will pass a large current without heating. The holder, by virtue of the construction employed, will securely retain the electrode during the welding operation, for the head cannot turn and the electrode will not loosen, thus eliminating any danger of an arc between the electrode and the holder parts. Finally, due to the complete insulation employed, preferably with plastic material, the holder can be readily positioned on metal without danger of damage to the holder by electrical contact.

It is to be understood that the form of my invention herewith shown and described is to be taken as a preferred example of the same and that various changes relative to the shape, size, material and arrangement of parts may be readily resorted to without departing from the spirit of the invention or the scope of the subjoined claim.

Having thus described my invention, I claim:

A holder for a welding rod comprising an electric cable carrying conductor rod having a reduced externally threaded portion, a square spindle carried by said rod, a head member equipped with a square bore in communication with an angular slot capable of receiving therein the welding rod, said head having a reduced externally threaded portion, the threads thereon being formed oppositely to the threads of said conductor rod, and a clamping nut encircling the threaded portions of said rod and head and capable of being twisted to effect longitudinal movement of said spindle relative to the welding rod.

RICHARD T. LAWRY.

REFERENCES CITED

The following references are of record in the file of this patent:

UNITED STATES PATENTS

| Number | Name | Date |
|---|---|---|
| 1,348,530 | Willard | Aug. 3, 1920 |
| 1,754,353 | Endebak | Apr. 15, 1930 |
| 2,294,033 | Hooper et al. | Aug. 25, 1942 |
| 2,330,931 | Stafford | Oct. 5, 1943 |
| 2,351,789 | Thompson | June 20, 1944 |